United States Patent [19]

Bussell

[11] Patent Number: 4,586,317
[45] Date of Patent: May 6, 1986

[54] MINUTELY CROSS CHANNELED VOIDING SEALING SYSTEMS

[75] Inventor: Clifford J. Bussell, Morton Grove, Ill.

[73] Assignee: Kraft, Inc., Glenview, Ill.

[21] Appl. No.: 546,885

[22] Filed: Oct. 31, 1983

[51] Int. Cl.⁴ .................... B65B 51/26; B65B 51/30
[52] U.S. Cl. .................................... 53/451; 53/479; 53/373; 156/581; 219/243
[58] Field of Search ............... 53/450, 548, 550, 551, 53/373, 479; 219/243; 156/181, 581; 17/33

[56] References Cited

U.S. PATENT DOCUMENTS

| | | | |
|---|---|---|---|
| 2,624,992 | 1/1953 | Salfisberg | 53/551 |
| 2,827,742 | 3/1958 | Bursak | 53/548 X |
| 3,258,385 | 6/1966 | Lake | 156/581 |
| 3,468,731 | 9/1969 | Obeda | 156/581 X |
| 3,522,135 | 7/1970 | Page | 53/550 X |
| 4,102,111 | 7/1978 | Nack et al. | 53/550 X |
| 4,455,808 | 6/1984 | Netzhammer | 53/373 |

*Primary Examiner*—Horace M. Culver
*Attorney, Agent, or Firm*—Fitch, Even, Tabin & Flannery

[57] ABSTRACT

Methods and apparatus for forming seal in a packaging material through containing a plastic combestible such as process cheese, utilizing sealing element having a plurality of small channels in the surface thereof having a directional component laterally of the longitudinal axis of the sealing element.

3 Claims, 6 Drawing Figures

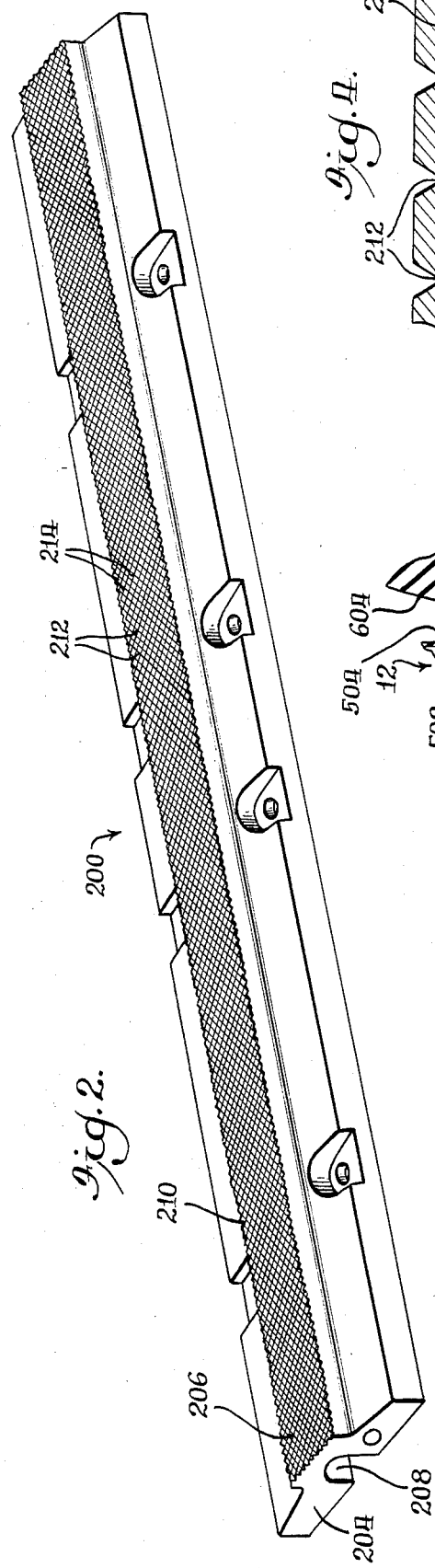
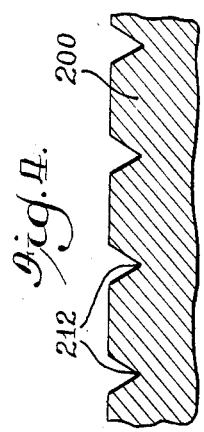
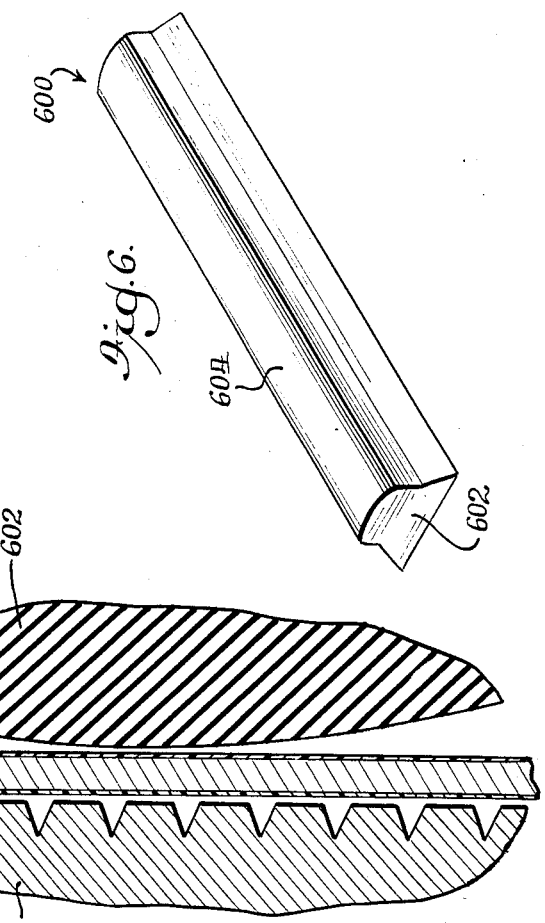
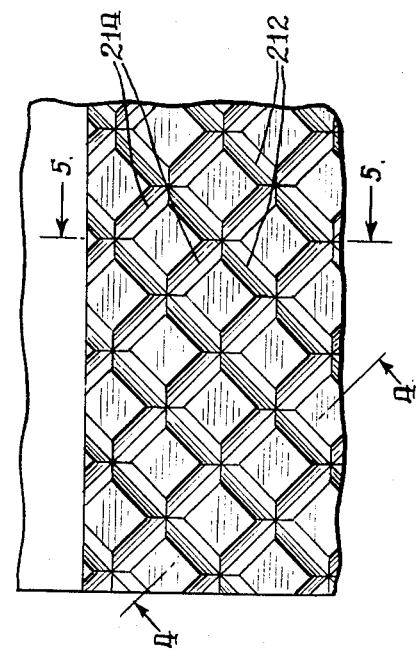
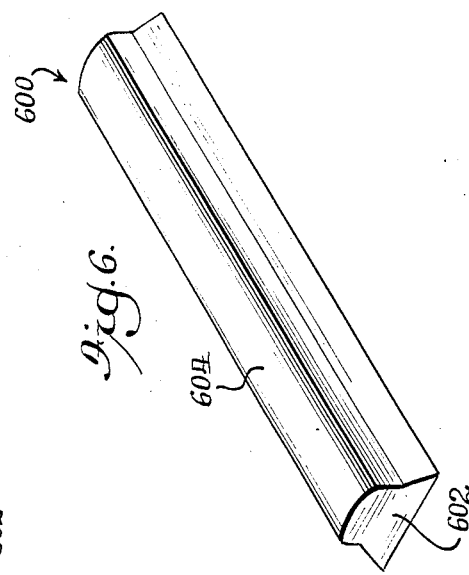

MINUTELY CROSS CHANNELED VOIDING SEALING SYSTEMS

The present invention is directed to methods and appparatus for packaging of viscous or plastic comestibles such as process cheese or the like, and more particularly is directed to improved sealing apparatus and methods for establishing seals in packaging materials by compression of the packaging material through the fluid comestible.

In the manufacture of individually wrapped slices of comestibles such as cheese slices, a hot, viscous cheese mass may be introduced into a packaging tube which is continuously formed from a suitable organopolymeric wrapping material, to provide a longitudinally continuous ribbon of processed cheese within the wrapping tube. The wrapping tube containing the cheese ribbon may be subsequently cross sealed and severed transversely to the longitudinal axis of tube in order to provide individually wrapped slices of processed cheese. In order to establish a desirable cross seal for such packages, it is necessary to displace the cheese from the cross sealing zone, and to adhesively contact the opposing interior surfaces of the film tube to establish a suitable cross seal. Such adhesive contacting has been conventionally carried out by compressing a wrapping film having an internal sealing layer of relatively low melting temperature between an elastomeric voiding element and metal cross sealing bar element heated to an elevated temperature sufficient to provide the desired adhesive effect on contact therewith under the operating conditions of contact time, pressure and temperature.

However, there have been substantial difficulties in the reliable cross sealing of the wrapping material through the comestible. In this regard, such difficulties include maintaining appropriate temperature ranges for sealing without damaging the wrapping material or causing the wrapping material to adhere to the sealing elements, limitations as to the types of packaging film which may be utilized in such packaging, incomplete displacement of cheese or other comestible from the seal area, the formation of so-called pipe-leaker channels from longitudinal wrinkling in the seal area, difficulties in reliable provision of package integrity, and the provision of package seals which open unevenly upon application of a relatively constant opening tension by the consumer. Various efforts to address these problems, such as provision of nonadhesive coatings on the cross sealing elements and voiding elements, have not been wholly successful. Accordingly, there has been a need for improved methods and sealing apparatus for cross sealing of comestible packages such as single slice comestible packages, and it is an object of the present invention to provide such improved methods and apparatus.

These and other objects will become more apparent from the following detailed description and the accompanying drawings of which FIG. 1 is a side view of an embodiment of single slice process cheese cross sealing apparatus employing minutely cross channeled sealing elements which may be utilized in carrying out various aspects of the present invention;

FIG. 2 is a perspective view of a minutely cross channeled element of the type utilized by the apparatus of FIG. 1, FIG. 3 is a top view of a portion of the sealing surface of the sealing bar of FIG. 2;

FIG. 4 is an enlarged cross sectional side view of the portion of the sealing element of FIG. 3, taken through line 4—4;

Figure 1:
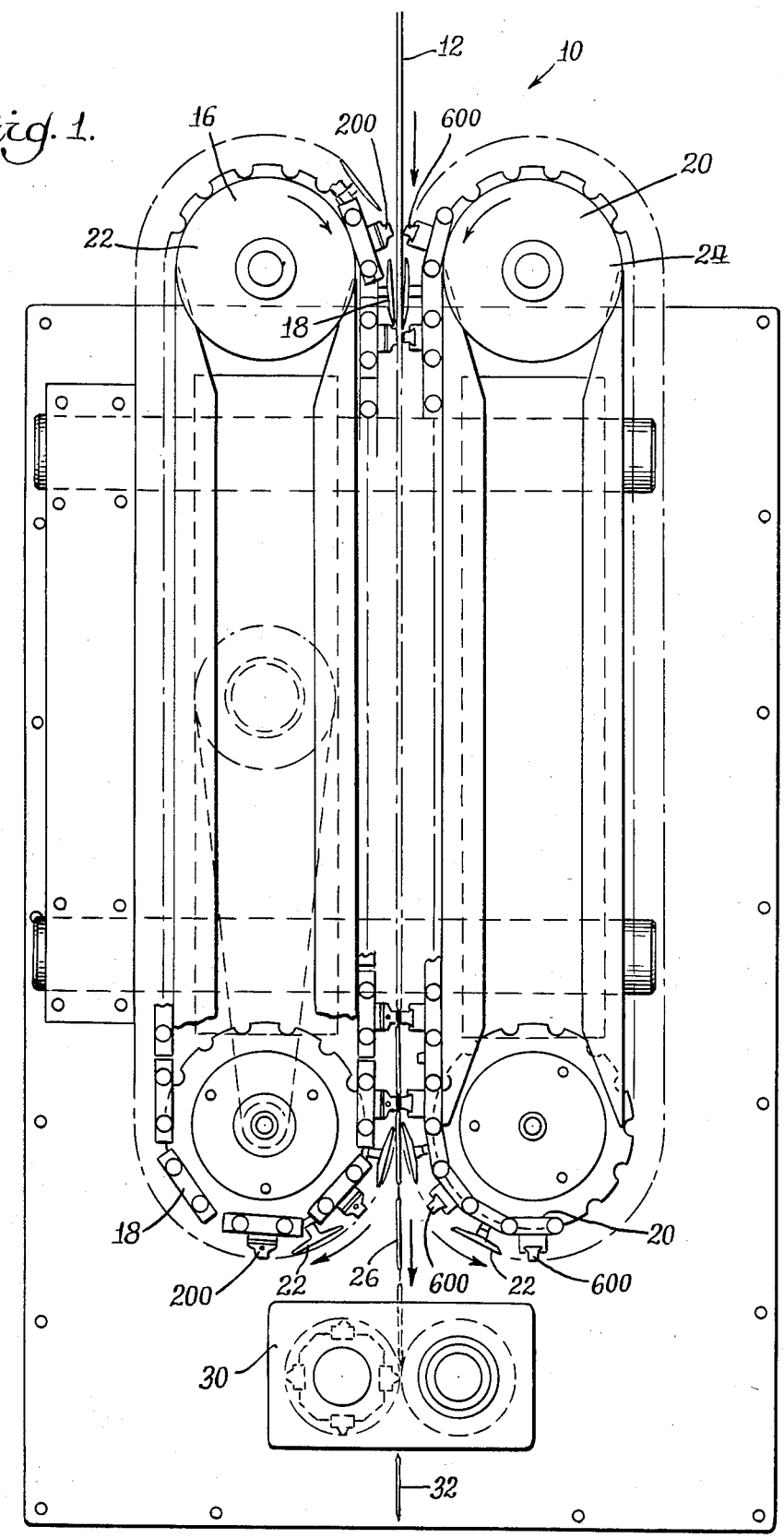

FIG. 5 is an enlarged cross sectional view of the minutely cross channelled sealing element of FIG. 3 taken through line 4—4 of FIG. 2, an opposing elastomeric voiding element, and an intermediate packaging film tube and cheese ribbon to be sealed by operation of the sealing element bar and voiding element; and FIG. 6 is a perspective view of an elastomeric voiding element of the type utilized by the apparatus of FIG. 1.

Generally in accordance with the present invention, methods and apparatus are provided for cross sealing of packaging materials through an intermediate layer of a viscous or plastic comestible such as process cheese. In accordance with various method aspects of the invention, a longitudinally continuous body of the plastic comestible to be packaged is provided which is continuously surrounded by a packaging film. The packaging film will desirably comprise a plurality of at least two layers including an inner sealing layer of relatively low thermoplastic melt temperature, and an outer layer which does not melt under sealing conditions. Such packaging films are conventionally utilized for packaging of comestibles such as process cheese. Further in accordance with the method, the longitudinally wrapped comestible ribbon is transversely compressed between a minutely cross channeled sealing surface and an elastomeric voiding surface to displace the comestible from the zone between the channeled sealing surface and the elastomeric voiding surface, and to seal the internal surfaces of the packaging material.

As indicated, an important feature of the present invention involves the interaction of a minutely cross channeled sealing surface with an elastomeric voiding surface in establishing a cross seal in the packaging material through the comestible. In this regard, sealing elements are provided with a sealing surface having a plurality of relatively small and close-spaced channels therein having a directional component which is orthagonal to the longitudinal axis of the sealing element. In this regard, channel arrays may be provided in the sealing element surface having a channel density of at least about 15 channels per inch and preferably in the range of from about 20 to about 40 channels per inch may be provided in the sealing surface. The presence of such channels may be viewed as providing a corresponding plurality of discontinuous direct-contact sealing surface having at least about 15 discrete sealing surfaces intermediate the cross channels. Particularly preferred embodiments of sealing bar systems in accordance with the present invention comprise sealing surfaces having an intersecting array of channels providing a network of channels and a corresponding array of discrete direct contact surface elements. Desirably such arrays will provide a discontinuous composite sealing surface having at least about 500, and most preferably at least about 800 discrete direct contact sealing surface elements per square inch of composite sealing surface.

The depth of the channels and their width is also important in the provision of secure cross seals. In this connection, the channels should desirably have a depth in the range of from about 0.005 inch to about 0.020 inch, most preferably about 0.010 inch and should best have a width in the range of from about 0.010 inch to about 0.030 inch at the intersection of the channels with the direct-contact sealing surface elements formed therebetween.

As indicated, the sealing elements may be provided with a sealing surface, which is discontinuous by virtue of the presence of a plurality of channels therein. However, the discontinuous sealing surface of the sealing element should best comprise at least about 30 percent of the area of the composite sealing surface including the channels therein, and preferably from about 40 to about 60 percent of the composite minutely channeled sealing surface. Accordingly, the channel area at the sealing surface should comprise less than about 70 percent and preferably from about 60 to about 40 percent of the area of the composite minutely channeled sealing surface. Minutely cross channeled sealing elements in accordance with the present invention may be readily manufactured of suitable metals and metal alloys by conventional milling techniques. Other techniques such as photomask generation with electro chemical milling, plasma etching or chemical etching may similarly be utilized to produce a desired discontinuous surface of discrete direct-contact sealing surfaces.

It is believed that the interaction of the rigid minutely channeled sealing element surface, with its minutely discontinuous sealing surface and correspondingly multiple channels, with the elastomeric voiding element upon compression of the longitudinally wrapped comestible therebetween, facilitates the removal and displacement of substantially all of the plastic comestible from the sealing zone while facilitating maintenance of the film in a taut, wrinkle-free condition, thereby producing uniform, reliable seals. The provision of multiple, discrete sealing element surfaces is also believed to concentrate the compressive force at the discrete sealing element surface points, thereby providing for secure attachment of the respective inner surfaces of the film tube at those points. By providing cross channels and corresponding discrete surface elements which are oriented at an angle with respect to the longitudinal axis of the film tube, "pipe channels", folds or wrinkles which otherwise preferentially tend to develop in that direction are minimized or eliminated.

Having generally described various aspects of the present invention, the invention will now be more particularly described with respect to the embodiment illustrated in FIGS. 1-6 of the drawings. In this regard, a cross sealing apparatus 10 is illustrated in FIG. 1 which is adapted to utilized a plurality of minutely cross channeled sealing elements 200 of the type shown in compressive opposition with elastomeric voiding element 600 of the type illustrated in FIG. 6. FIGS. 3 through 6 provide enlarged views of portions of the sealing element 200 and elastomeric voiding element 600.

As illustrated in FIG. 1, a continuous ribbon 12 of longitudinally wrapped cheese, preferably cheese such as process cheese which has been extruded or otherwise provided in contact with the interior surface of the wrapping internal at elevated temperature (e.g. above about 155° F.), may be produced in accordance with conventional practice. The enclosed cheese ribbon should best be in continuous contact with the interior surfaces of the wrapping material, with substantially no air voids therebetween. In this regard, the process cheese or other comestible may be delivered from conventional processing apparatus at elevated temperatures and continuously extruded in molten or fluid form into a former or plastic film wrapper to provide a continuous sheet of process cheese surrounded by the organopolymeric wrapper.

As illustrated in FIG. 5, which includes a cross sectional view of the wrapped cheese ribbon 12 along the direction of cross sealing, the enclosed cheese ribbon 502 is in direct and intimate contact with the surrounding wrapping material 504. The enclosed cheese ribbon 504 may desirably have a thickness in the range of, for example, from about 0.1 inch to about 0.3 inch, and may have a width in the range of from about 2 to about 5 inches. Typically the cheese ribbon may have a width of about 3.5 inches and a thickness of about $\frac{1}{8}$ inch. The wrapping material film 504 may comprise an outer layer of relatively heat-impervious food grade plastic such as polypropylene or polyester polymer, and an inner coating of a relatively lower melting sealing material, such as a food grade polyethylene or polyethylene copolymer. The film tube edges may desirably overlap longitudinally at their respective ends, or may be sealed in face to face relationship, in the initial formation of the wrapped cheese ribbon 12.

Although the process cheese is typically extruded at elevated temperatures, the wrapped cheese ribbon 12 may be desirably cooled in an appropriate manner, such as to room temperature or below (e.g., 55°-70° F.) before cross sealing. Such cooling increases the firmness of the cheese ribbon and renders it more difficult to void from the seal area, increasing the desirability of sealing systems in accordance with the present disclosure.

The term "plastic" as used herein includes viscous materials which do not have a distinct stress-strain yield point, but which are difficult to void from the sealing zone. It will be appreciated that while the illustrated embodiment utilizes processed cheese, various other plastic food materials may similarly be utilized such as natural cheeses, cheese foods, imitation cheeses, and meat emulsions.

As shown in the longitudinally wrapped cheese ribbon 12 may be transported from one or more suitable aligning and/or cooling rollers (not shown) and enters the sealing apparatus 16. The sealing apparatus 16 comprises two opposing arrays 18, 20 of sealing elements and voiding elements respectively, arranged and interconnected in the form of belts which may be driven in registration at relatively high speed. In the sealing bar belt array 18, a plurality of sealing bars 200 (FIG. 2) alternately arranged with flattening plate elements 22 are connected in an endless belt arrangement. In the voiding element array 20, a plurality of spaced apart elastomeric voiding elements 600 (FIG. 6), similarly separated by flattening plates 22 are connected to form an endless belt of substantially identical length. In the illustrated embodiment 10, the sealing element belt array 18 comprises twenty six sealing bar units and twenty six flattening plate unit 22 alternating therewith. Similarly, the voiding belt array 20 comprises twenty six voiding elements 600 and twenty six flattening plate units 22 alternating thereewith. Only a limited number of the respective scaling element and voiding elements which comprise the respective belts 18, 20 are illustrated in FIG. 1, it being understood that these elements are regularly and continuously disposed along the entire length of the belts. The sealing bar elements 200 and the voiding elastomeric elements 600 are spaced apart at a distance corresponding to the desired length of the finished product packages, and are maintained in opposed alignment by suitable drive mechanism including driving elements 22, 24 for the respective belt arrays 18, 20. In operation, the sealing bar belt 18, and the voiding rubber belt 20 are driven such that the film wrapped cheese ribbon 12 is pulled therebetween in a direction indicated by the arrow in FIG. 1. The belts 18 and 20 are maintained under suitable compression in respect to each other that the respectively opposing sealing and voiding elements 200, 600 are forced into compression with the wrapped comestible ribbon 12 therebetween at a contact pressure in the range of from about 150 to about 600 pounds per square inch of contact area, and preferably in the range of from about 250 to about 400 psi. In the illustrated embodiment 10, approximately six sealing bar-voiding elements of the respective belts 18,20 are in such compressive contact, with several additional sealing-voiding pairs at the input and discharge ends of the belts 18,20 being respectively undergoing compression and decompression.

As indicated, the minutely cross channeled surface configuration of the sealing bar elements is an important feature of the present invention, and the embodiment of sealing bar elements utilizing in apparatus 10 will now be described in more detail. In this regard, sealing bar element 200 is illustrated in FIG. 2 in perspective view. The illustrated sealing bar element 200 comprises a body 204 having a substantially flat contact surface 206, which in the illustrated embodiment has a width of about 15/32 inch and a length of about 10 inches along its longitudinal axis. The entire body of the sealing bar 200 is fabricated from a relatively hard metallic material such as nickel steel. The bar 200 may be mounted on the conveying belt 18 of the sealing apparatus 16 by the illustrated mounting holes and may be heated to the desired cross sealing temperature by an appropriate electrical resistance heating element disposed within recess 208 on the belt-coupling side of the sealing bar.

The sealing surface 206 of the bar 200 comprises a substantially flat, planar surface 210, into which are machined at a plurality of arrays 212, 214 of regularly spaced recessions. The illustrated recessions comprise a first set of grooves 212 which are approximately 0.010 inches deep on 0.035 inch center to center spacings. The grooves 212 are cut at a 45° angle 216 in respect to the longitudinal axis of the sealing bar 200. The grooves are cut with a 60° included angle along the channel direction. A second set of intersecting but otherwise substantially identical, regularly spaced grooves 214 approximately 0.010 inches deep on 0.035 center to center spacings is also cut at a 45° angle with respect to the longitudinal axis of the sealing bar 200, also having a 60° included angle of the cut along the channel direction. The grooves 212 and the grooves 214 are accordingly oriented approximately 90° with respect to each other to provide a series of regularly spaced, discrete, small sealing surfaces 212 located between the two channel arrays 212, 214. In this regard, over about 800 discrete sealing surfaces 210 per square inch of sealing bar surface are provided by the interconnecting channels 212, 214. The channels 212, 214 also provide an interconnecting series of channels for longitudinal and axial displacement of cheese from along the longitudinal center line of the sealing bar to the outside longitudinal edges of the sealing bar, upon interaction with the voiding rubber element 600.

As shown in FIG. 6, the voiding element 600 comprises an elastomeric body 602 having a convex sealing surface 604 which is arcuate in a direction about the longitudinal axis of the voiding element 600, such that upon compression against the film tube 12, cheese is progressively displaced from the center of the seal area generally laterally of the contact force.

As indicated, at least the surface portion of the elastomeric voiding element 600 which is adapted to oppose the sealing bar element 200 in compression of the film tube 12 therebetween should be of an elastomeric material. Conventionally, such voiding elements may desirably be of an elastomeric material such as polyurethane elastomer having a Shore A durometer hardness value in the range of from about 70 to about 90. By providing the curved surface 604 of the voiding element, the compressive force is initially applied at a center point of contact with the comestible containing film tube, such that the comestible is displaced outwardly from the line of contact upon progressive compression of the voiding element against the sealing bar element 200. FIG. 5 illustrates the configuration ot the comestible containing film tube, the sealing element 200 and the voiding element. Further in this regard, it is believed that the elastomeric nature of the voiding element compresses the film layers at least partially into the channels 212, 214 of the sealing bar element, thereby stretching the film and pumping the product contained therebetween via the channels into the package zone adjacent the sealing zone. The sealing bar elements 200 are maintained at a predetermined elevated temperature which is suitable for sealing the thermoplastic film layer under the time-pressure conditions utilized in the process. Conventional heating elements and control apparatus (not shown) may be used for this purpose. In the illustrated embodiment, the sealing bar temperatures may be maintained at a relatively low temperature in the range of from about 200 Ⓡ to about 250° F.

Returning to FIG. 1, the sealing bar belt 18 and opposing voiding element belt 20 may be operated at relatively high speed, such as at least about 100 feet per minute, which provides a contact time in the illustrated embodiment 10 of the sealing bars 200 at maximum contact pressure of about one second or less. Accordingly, the displacement of the comestible and the sealing of the inner surfaces of the wrapping material must be accomplished in limited time. Typically, the apparatus 10 may be operated at a speed of about 200 feet per minute of the film ribbon with a corresponding contact time at maximum preessure of about 0.5 second. As the ribbon travels into the sealing system 16, a sealing bar element of the sealing belt 18 and a correspondingly aligned, opposing elastomeric voiding element of the voiding element belt 20 are respectively brought into contact with the cheese ribbon and gradually force the plastic cheese from the zone separating the elements as they are brought together by the operation of the belts 16, 18. Because the surface of the voiding element 600 is convex, the cheese is progressively displaced from the initial point of contact of the curved elastomeric voiding element 600 until the sealing bars and respectively opposing voiding elements 600 are maintained in maximum compressive contact with the packaging film therebetween. The belt sealing bars bearing the sections 200 and the belt section bearing the corresponding voiding element sections of the belt are cammed against respective pressure plates in order to maintain a steady compressive force therebetween. The flattening elements 22 are separated at a predetermined distance generally corresponding to the desired thickness of the individually wrapped cheese packages. The sealing bar element and the corresponding elastomeric voiding elements are gradually brought together and maintained in compressive contact for the duration of travel through the sealing element 16 until the distal end of the sealing station 16 is reached, where the belts, by a similarly inclined camming plate gradually separate the sealing bars and voiding elements for their return travel to the top of the sealing station to reengage the wrapped cheese ribbon at the proximate input end of the sealing station.

Upon emerging from the discharge end of the sealing station 16, the film has been transversely sealed at spaced apart intervals corresponding to the spacing intervals of the sealing bars 200 and opposing voiding elements 600 of the belts 18, 20. The continuous, transversely sealed film 26 formed thereby is subsequently conducted to a cutting station 30 which may be of conventional design in which the film 26 is transversely cut at approximately the center of the cross seals to provide individual packages 32. The sealing station 16 and its corresponding cutting station 30 may be operated at relatively high speed to provide individually wrapped comestible slices with package cross seals of desirable uniform strength and integrity. Upon opening, the cross seal may be smoothly opened in a continuous manner by the consumer without erratic unzipping, or "skipping". In the illustrated embodiment, the sealing station provides approximately 10 sealing bars in contact with the ribbon, with approximately size maintained at maximum contact pressure therewith, over a length of about 40 inches. At an operating speed in the range of about 600 packages per minute, this corresponds to a maximum pressure contact time of less than about 0.5 seconds for each transverse cross seal. By extending the depth of the sealing station 16, multiple film tubes 12 may be processed, thereby multiplying the production rate of individually wrapped packages 32.

The utilization of sealing methods and apparatus in accordance with the present invention produces a reliable, easy to open seal and substantially eliminates the problem of cheese "leak out" and nonuniform cross sealing. Such methods and apparatus further provide improved line productivity, reduction of costly product rejects, reduces or eliminates film sticking to the voiding rubbers by reason of reduction in sealing temperatures, and provides for reliable removal of cheese in the seal area. The utilization of minutely cross channeled sealing elements further provides for substantial reduction in the sealing temperature of the sealing bars, and permits reliable, high speed operation of various types of packaging film which otherwise have not previously been useful in such packaging.

While the present invention has been particularly described with respect to the specific embodiment illustrated in FIGS. 1 through 6, it will be appreciated that various modifications and adaptations will become apparent from the present disclosure and are intended to be within the spirit and scope of the present invention.

What is claimed is:

1. A method for cross sealing of a packaging material tube through an intermediate layer of plastic comestible comprising the steps of providing a longitudinally continuous body of the plastic comestible to be packaged which is continuously surrounded by a packaging film comprising a plurality of at least two layers including an inner sealing layer of relatively low thermoplastic melt temperature, and an outer layer which does not melt under sealing conditions to provide a film tube wrapped comestible, transversely compressing said film tube between a rigid, minutely cross channeled sealing surface having a cross channel density of at least about 15 channels per inch, said channels having a depth in the range of from about 0.005 inch to about 0.020 inch and a width in the range of from about 0.01 inch to about 0.03 inch, and said channels providing therebetween a density of at least about 500 discrete sealing surfaces per square inch comprising at least about 30 percent of the total surface area of said cross channeled sealing surface, and an elastomeric voiding surface at a pressure in the range of from about 150 to about 600 pounds per square inch to displace the comestible from the zone between the channeled sealing surface and the elastomeric voiding surface, whereby the eleastomeric voiding surface forces the packaging material at least partially into the channels of the minutely channeled cross sealing surface to stretch the film and to pump the comestible along the channels into the package zone adjacent the cross-channeled sealing surface, and to cross seal the internal surfaces of the packaging material, and severing the film tube at the cross seal.

2. A method in accordance with claim 1 wherein said comestible is selected from the group consisting of process cheese, natural cheese, cheese food, imitation cheese and meat emulsion, wherein said elastomeric voiding surface is convexly arcuate and has a Shore A durometer hardness in the range of from about 70 to about 90, wherein said discrete surface elements comprises from about 40 to about 60 percent of the area of said sealing surface, and wherein said transverse compression is carried out at a pressure in the range of from about 250 to about 400 psi for a duration of about one second or less.

3. A rigid, metallic, minutely cross channeled sealing element comprising a sealing element body having a composite metallic sealing surface, said composite metallic sealing surface having a plurality of intersecting arrays of relatively small and close-spaced parallel cross channels therein each communicating with the respective sides of the sealing element and having a channel density of at least about 15 per inch, wherein said channels have a depth in the range of from about 0.005 inch to about 0.020 inch, wherein said metallic sealing surface has a density of at least about 500 discrete sealing surfaces per square inch and wherein said discrete sealing surfaces comprise at least about 30 percent of the surface area of said metallic sealing surface.

* * * * *